United States Patent
Weis et al.

(10) Patent No.: US 12,374,155 B2
(45) Date of Patent: Jul. 29, 2025

(54) SELF-SERVICE TERMINAL AND METHOD FOR PROVIDING SECURITY AT A SELF-SERVICE TERMINAL

(71) Applicant: Wincor Nixdorf International GmbH, Paderborn (DE)

(72) Inventors: Eduard Weis, Paderborn (DE); Alexander Knobloch, Paderborn (DE); Sebastian Engelnkemper, Langenberg (DE)

(73) Assignee: DIEBOLD NIXDORF SYSTEMS GMBH, Paderborn (DE)

( * ) Notice: Subject to any disclaimer, the term of this patent is extended or adjusted under 35 U.S.C. 154(b) by 543 days.

(21) Appl. No.: 17/786,237

(22) PCT Filed: Dec. 10, 2020

(86) PCT No.: PCT/EP2020/085523
§ 371 (c)(1),
(2) Date: Aug. 31, 2022

(87) PCT Pub. No.: WO2021/122306
PCT Pub. Date: Jun. 24, 2021

(65) Prior Publication Data
US 2022/0406092 A1    Dec. 22, 2022

(30) Foreign Application Priority Data
Dec. 17, 2019    (EP) ..................... 19217165

(51) Int. Cl.
*G06V 40/00*    (2022.01)
*G06V 40/16*    (2022.01)

(52) U.S. Cl.
CPC .......... *G06V 40/172* (2022.01); *G06V 40/166* (2022.01); *G06V 40/168* (2022.01)

(58) Field of Classification Search
CPC ...... G06V 40/172; G06V 40/16; G06V 40/06; G06V 40/168; G06V 40/161; G06Q 20/18;
(Continued)

(56) References Cited

U.S. PATENT DOCUMENTS

| 10,043,184 B2 * | 8/2018 | Agarwal .......... G06Q 20/40145 |
| 2016/0063235 A1 * | 3/2016 | Tussy ..................... G06V 40/70 726/6 |

(Continued)

FOREIGN PATENT DOCUMENTS

| CN | 118115165 A | * | 5/2024 |
| DE | 102011001541 A1 | | 9/2012 |

OTHER PUBLICATIONS

Karovaliya, Mohsin, et al. "Enhanced security for ATM machine with OTP and facial recognition features." Procedia Computer Science 45 (2015): 390-396. (Year: 2015).*

(Continued)

*Primary Examiner* — Van D Huynh
(74) *Attorney, Agent, or Firm* — Black McCuskey

(57) ABSTRACT

A self-service terminal and a method for providing security at a self-service terminal are disclosed, wherein the self-service terminal comprises: an imaging device, configured for providing at least one digital image; at least one processor, configured for applying a facial recognition method to the at least one digital image; and for controlling the self-service terminal using a facial recognition criterion depending on the result of the facial recognition method.

11 Claims, 6 Drawing Sheets

(58) Field of Classification Search
CPC ............ G06Q 20/206; G06Q 20/40145; G07F 19/207
See application file for complete search history.

(56) References Cited

U.S. PATENT DOCUMENTS

| | | |
|---|---|---|
| 2016/0125404 A1 | 5/2016 | Rood |
| 2016/0275518 A1* | 9/2016 | Bowles ................ G06V 40/166 |
| 2017/0006114 A1* | 1/2017 | Mande ............... G06Q 20/1085 |
| 2017/0352015 A1* | 12/2017 | Xu ....................... G06V 40/113 |
| 2018/0107865 A1* | 4/2018 | Ahlawat ............. G06V 40/161 |
| 2019/0147156 A1* | 5/2019 | Burri .................... G06V 40/174 713/186 |
| 2019/0251571 A1* | 8/2019 | O'Reilly .............. G06V 40/168 |
| 2020/0042811 A1* | 2/2020 | Edwards ............ G06Q 20/1085 |
| 2020/0142471 A1* | 5/2020 | Azam ................ H04M 1/72454 |
| 2020/0211570 A1* | 7/2020 | Novack ................ G06V 40/172 |
| 2021/0271858 A1* | 9/2021 | Cruz ..................... G07F 19/207 |

OTHER PUBLICATIONS

Sikandar, Tasriva et al. "ATM crime detection using image processing integrated video surveillance: a systematic review." Multimedia Systems 25 (2019): 229-251. (Year: 2019).*
International Search Report filed in the corresponding PCT Application dated Mar. 1, 2021, written in the German language; 4 pages.
International Search Report filed in the corresponding PCT Application dated Mar. 1, 2021, translated to the English language; 2 pages.
Written Opinion filed in the corresponding PCT Application dated Mar. 1, 2021, written in the German language; 5 pages.

* cited by examiner

SELF-SERVICE TERMINAL AND METHOD FOR PROVIDING SECURITY AT A SELF-SERVICE TERMINAL

CROSS-REFERENCE TO RELATED APPLICATIONS

This application is a National Phase filing of International Application Ser. No. PCT/EP2020/085523, for a SELF-SERVICE TERMINAL AND METHOD FOR PROVIDING SECURITY AT A SELF-SERVICE TERMINAL, filed 2020 Dec. 10.

BACKGROUND

Various exemplary embodiments relate to a self-service terminal and to a method for providing security at a self-service terminal.

At a self-service terminal, such as an automated teller machine, for example, a user can take advantage of various services without interaction with an additional person. Security violations can occur here during the use of the self-service terminal. By way of example, at an automated teller machine a disguised/masked person may withdraw money using a stolen bank card, or an additional person may covertly observe the PIN (personal identification number) entered by a user, or, after the PIN has been entered, an additional person may push the user out of the way or overpower the user and steal/purloin the money from the dispensing tray, or the user may forget the money in the dispensing tray and/or may forget the bank card and an additional person may take the money from the dispensing tray and/or the bank card (for example, the additional person may deliberately wait for a user to forget money and/or a bank card). Therefore, it may be necessary to provide security at a self-service terminal, for example to ensure security for a user during the use of the self-service terminal.

SUMMARY

In accordance with various embodiments, a self-service terminal and a method for providing security at a self-service terminal are provided which are able to provide security at a self-service terminal, i.e. which are able to prevent harmful behavior at a self-service terminal.

In accordance with various embodiments, a self-service terminal comprises: an imaging device, configured for providing at least one digital image; at least one processor, configured for applying a facial recognition method to the at least one digital image; and for controlling the self-service terminal using a facial recognition criterion depending on the result of the facial recognition method.

The self-service terminal having the features of independent claim 1 forms a first example.

The imaging device can comprise one or more imaging sensors, wherein the one or more imaging sensors can optionally comprise a camera sensor and/or a video camera sensor. The features described in this paragraph in combination with the first example form a second example.

The facial recognition method can comprise determining whether the at least one digital image comprises a face of a first person. The facial recognition method can furthermore comprise extracting biometric features of the face if the at least one digital image comprises the face of the first person. The features described in this paragraph in combination with the first example or the second example form a third example.

The facial recognition criterion can be dependent on whether a face was recognized or was not recognized. The facial recognition criterion can be dependent on the biometric features of the face. To put it another way, the facial recognition criterion can comprise whether a face was recognized in the at least one digital image or whether no face was recognized and, if a face was recognized, the facial criterion can be dependent on the extracted biometric features, for example the number of extracted biometric features or whether predefined biometric features could not be extracted. The features described in this paragraph in combination with one or more of the first example to the third example form a fourth example.

The facial recognition criterion can comprise, if the at least one digital image comprises a face of the first person, whether the face is hidden. The feature described in this paragraph in combination with the third example or the fourth example forms a fifth example.

The face can be hidden if at least one biometric feature of the biometric features does not satisfy a feature criterion. Illustratively, for example, a biometric feature of the mouth region of the face cannot be extracted and the at least one processor can determine that the face is hidden, for example masked, in this case. The feature described in this paragraph in combination with the fifth example forms a sixth example.

The at least one processor can be configured for controlling the self-service terminal in such a way that the self-service terminal is activated from a standby state if the face is not hidden. That has the effect that the self-service terminal is activated only if a non-masked or non-disguised person would like to operate or use the self-service terminal. The feature described in this paragraph in combination with the fifth example or the sixth example forms a seventh example.

The at least one processor can be configured for controlling the self-service terminal in such a way that the self-service terminal maintains a standby state if the face is hidden. That has the effect that the self-service terminal cannot be used or operated by a disguised or masked person, such as a thief, for example. The self-service terminal can optionally furthermore comprise a display device, which can be configured to provide the person assigned to the face with information that the face is hidden. The features described in this paragraph in combination with one or more of the fifth example to the seventh example form an eighth example.

The facial recognition method can determine that the at least one digital image comprises a first face of a first person and furthermore a second face of a second person, and the processor can be configured for controlling the self-service terminal using a first criterion and a second criterion depending on the result of the facial recognition method, wherein the first criterion can be assigned to the first person and wherein the second criterion can be assigned to the second person. The at least one processor can be configured to determine first biometric features assigned to the first face of the first person and/or second biometric features assigned to the second face of the second person. That has the effect that a disguised or masked person in the vicinity of the user is recognized and the self-service terminal can transition for example to a security state, by way of example, dispensing of money at an automated teller machine can be stopped or blocked in this case. The features described in this paragraph in combination with one or more of the first example to the eighth example form a ninth example.

The self-service terminal can furthermore comprise a user interface. The user interface can comprise a display device, which can be configured to provide to the first person the at least one digital image showing the first face of the first person and the second face of the second person. That has the effect that a user of a self-service terminal can be advised of a potential threat or a potential security violation. The features described in this paragraph in combination with the ninth example form a tenth example.

The at least one processor can furthermore be configured for determining a first distance between the first person and the self-service terminal. The at least one processor can furthermore be configured for determining a second distance between the second person and the self-service terminal. The display device can be configured for providing distance information to the first person using the first distance of the first person and the second distance of the second person. That has the effect, for example, that the user can be advised that a personal space distance is not being complied with. The features described in this paragraph in combination with the ninth example or the tenth example form an eleventh example.

The at least one processor can be configured to determine the first distance of the first person using the at least one digital image. The at least one processor can be configured to determine the first distance using a first interocular distance of the first person. The at least one processor can be configured to determine the first interocular distance using the extracted first biometric data. The at least one processor can be configured to determine the second distance of the second person using the at least one digital image. The at least one processor can be configured to determine the second distance using a second interocular distance of the second person. The at least one processor can be configured to determine the second interocular distance using the extracted second biometric data. The features described in this paragraph in combination with the eleventh example form a twelfth example.

The self-service terminal can comprise at least one distance sensor configured for detecting at least one distance of a person, wherein the at least one processor determines the first distance of the first person and/or the second distance of the second person using the detected distance. The features described in this paragraph in combination with the eleventh example form a thirteenth example.

The imaging device can be configured to provide a first digital image and a second digital image, wherein the second digital image temporally follows the first digital image. The facial recognition method can determine that the first digital image comprises a first face of a first person and that the second digital image does not comprise the first face of the first person, and the at least one processor can be configured for controlling the self-service terminal in such a way that the self-service terminal transitions to a security state. That has the effect, for example, that, if a user forgets to take the money from the dispensing tray of an automated teller machine, the dispensing tray can be closed in the security state. That furthermore has the effect that, if a user at the self-service terminal is overpowered and/or pushed out of the way, the attacker cannot operate the self-service terminal in the security state. The features described in this paragraph in combination with one or more of the first example to the thirteenth example form a fourteenth example.

The self-service terminal can furthermore comprise a storage device configured to store the at least one digital image. The feature described in this paragraph in combination with one or more of the first example to the fourteenth example forms a fifteenth example.

The storage device can comprise a volatile memory for storing the at least one digital image. The feature described in this paragraph in combination with the fifteenth example forms a sixteenth example.

The storage device can furthermore be configured to erase the at least one digital image after a termination criterion has been satisfied. If biometric features for a face of a person were extracted, the storage device can furthermore be configured to erase the extracted biometric features after the termination criterion has been satisfied. That has the effect that the personal data of a user are not stored permanently, but rather only during the operation of the self-service terminal, and the anonymity of the user is thus ensured. The features described in this paragraph in combination with the fifteenth example or the sixteenth example form a seventeenth example.

The self-service terminal can be an automated teller machine, a self-service checkout or a self-service kiosk. The features described in this paragraph in combination with one or more of the first example to the seventeenth example form an eighteenth example.

A method for providing security at a self-service terminal can comprise: detecting at least one digital image; applying a facial recognition method to the at least one digital image; and controlling the self-service terminal using a facial recognition criterion depending on the result of the facial recognition method. The method having the features described in this paragraph forms a nineteenth example.

The facial recognition method can comprise determining whether the at least one digital image comprises a face of a first person. The facial recognition method can furthermore comprise extracting biometric features of the face if the at least one digital image comprises the face of the first person. The features described in this paragraph in combination with the nineteenth example form a twentieth example.

The facial recognition criterion can be dependent on whether a face was recognized or was not recognized. The facial recognition criterion can be dependent on the biometric features of the face. The features described in this paragraph in combination with the twentieth example form a twenty-first example.

The facial recognition criterion can comprise, if the at least one digital image comprises the face of the first person, whether the face is hidden. The feature described in this paragraph in combination with the twentieth example or the twenty-first example forms a twenty-second example.

The face can be hidden if at least one biometric feature of the biometric features does not satisfy a feature criterion. The feature described in this paragraph in combination with the twenty-second example forms a twenty-third example.

Controlling the self-service terminal can comprise: controlling the self-service terminal in such a way that the self-service terminal is activated from a standby state if the face is not hidden. The feature described in this paragraph in combination with the twenty-second example or the twenty-third example forms a twenty-fourth example.

Controlling the self-service terminal can comprise: controlling the self-service terminal in such a way that the self-service terminal maintains a standby state if the face is hidden. The feature described in this paragraph in combination with one or more of the twenty-second example to the twenty-fourth example forms a twenty-fifth example.

The facial recognition method can determine that the at least one digital image comprises a first face of a first person and furthermore a second face of a second person, and controlling the self-service terminal can comprise: controlling the self-service terminal using a first criterion and a second criterion depending on the result of the facial recognition method, wherein the first criterion can be assigned to the first person and wherein the second criterion can be assigned to the second person. The method can comprise determining first biometric features assigned to the first face of the first person. The method can comprise determining second biometric features assigned to the second face of the second person. The features described in this paragraph in combination with one or more of the nineteenth example to the twenty-fifth example form a twenty-sixth example.

The method can furthermore comprise providing to the first person the at least one digital image showing the first face of the first person and the second face of the second person. The features described in this paragraph in combination with the twenty-sixth example form a twenty-seventh example.

The method can furthermore comprise: determining a first distance between the first person and the self-service terminal. The at least one processor can furthermore be configured for determining a second distance between the second person and the self-service terminal. The method can furthermore comprise providing distance information to the first person using the first distance of the first person and the second distance of the second person. The features described in this paragraph in combination with the twenty-sixth example or the twenty-seventh example form a twenty-eighth example.

The first distance of the first person can be determined using the at least one digital image. The first distance can be determined using a first interocular distance of the first person. The first interocular distance can be determined using the extracted first biometric data. The second distance of the second person can be determined using the at least one digital image. The second distance can be determined using a second interocular distance of the second person. The second interocular distance can be determined using the extracted second biometric data. The features described in this paragraph in combination with the twenty-eighth example form a twenty-ninth example.

The first distance of the first person and/or the second distance of the second person can be detected using at least one distance sensor. The features described in this paragraph in combination with the twenty-eighth example form a thirtieth example.

Detecting at least one digital image can comprise detecting a first digital image and a second digital image, wherein the second digital image can temporally follow the first digital image. The facial recognition method can determine that the first digital image comprises a first face of a first person and that the second digital image does not comprise the first face of the first person, and controlling the self-service terminal can comprise: controlling the self-service terminal in such a way that the self-service terminal transitions to a security state. The features described in this paragraph in combination with one or more of the nineteenth example to the thirtieth example form a thirty-first example.

BRIEF DESCRIPTIONS OF THE DRAWINGS

DETAILED DESCRIPTION

Figure 1:
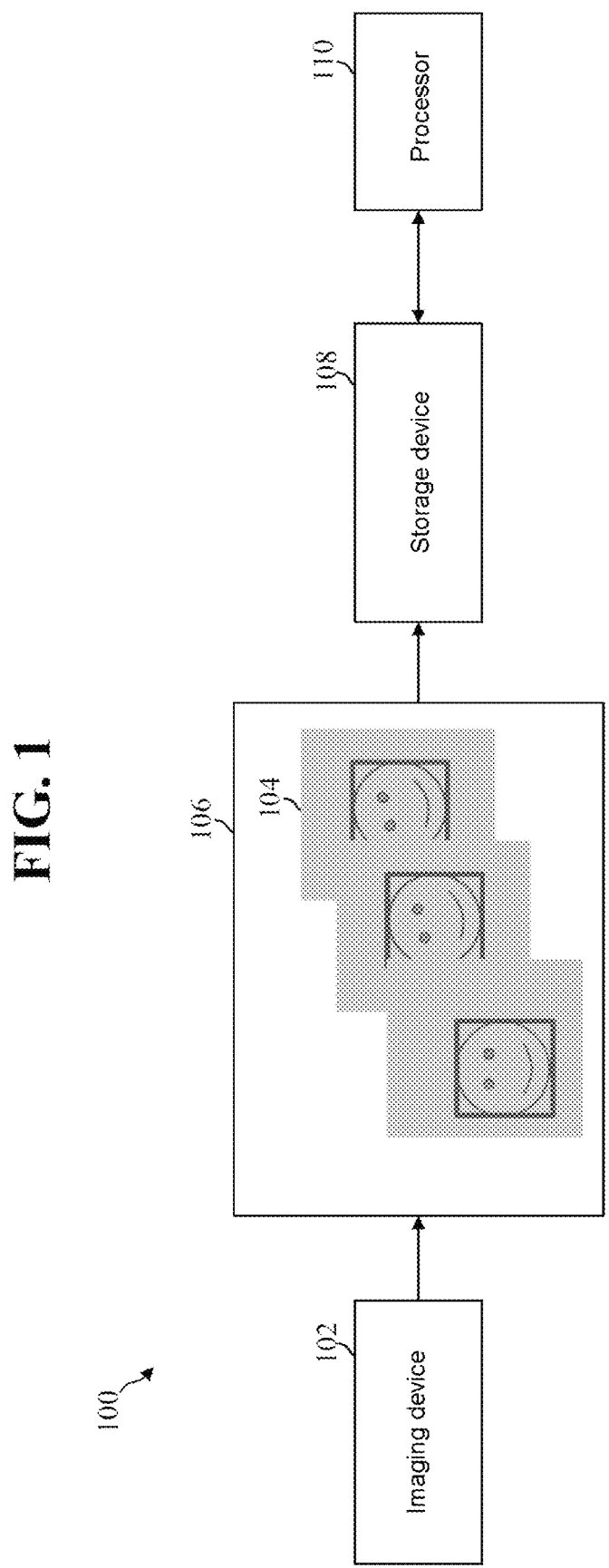
FIG. 1 shows a self-service terminal in accordance with various embodiments.

In the following detailed description, reference is made to the accompanying drawings, which form part of this description and show for illustration purposes specific embodiments in which the invention can be implemented.

The term "processor" can be understood as any type of entity which allows data or signals to be processed. The data or signals can be handled for example in accordance with at least one (i.e. one or more than one) specific function executed by the processor. A processor can comprise or be formed from an analog circuit, a digital circuit, a mixed-signal circuit, a logic circuit, a microprocessor, a central processing unit (CPU), a graphics processing unit (GPU), a digital signal processor (DSP), a programmable gate array (FPGA), an integrated circuit or any combination thereof. Any other type of implementation of the respective functions described more thoroughly below can also be understood as a processor or logic circuit. It is understood that one or more of the method steps described in detail herein can be implemented (e.g. realized) by a processor, by means of one or more specific functions executed by the processor. The processor can therefore be configured to carry out one of the methods described herein or the components thereof for information processing.

Reference is made hereinafter to digital images and the processing thereof. The digital images can be any type of digital image data and can be a digital image representation of reality (e.g. of the capture region) at a point in time of capturing the digital image data. The imaging of reality can be effected by means of a lens, for example, which projects light onto the surface of an imaging sensor (e.g. a Bayer sensor). Capturing the image data can comprise reading the imaging sensor while the light is projected onto the surface thereof. The image data thus obtained can initially be in the so-called raw data format (also referred to as RAW), which comprises pixel by pixel the measured values read out from the imaging sensor and/or is processed as such. The image data can optionally be or have been converted into a different image format during processing, e.g. into raster graphics (different than RAW as raster graphics) or vector graphics, such that their further processing takes place in this image format, or they can be converted arbitrarily between these. The converting can optionally comprise interpolating the measured values from the imaging sensor (e.g. by means of demosaicings), e.g. in order to obtain complete multicolored color information for each pixel of a plurality of pixels or in order to require less memory space or computing power. The image data can optionally be compressed (e.g. in order to require less memory space or computing power) or uncompressed (e.g. in order to avoid corruption). The respective image format can also define the color space according to which the color information is specified.

The simplest case is a binary color space, in which one black-and-white value is stored per pixel. In the case of a somewhat more complex color space (also referred to as grayscale color space), intermediate levels between black and white are stored (also referred to as grayscale values). However, the color space can also be spanned by a plurality of (e.g. two or more) primary colors, such as red, green and blue, for example. If the measured values are intended to comprise multicolored color information, for example, a wavelength-sensitive imaging sensor can be used. The measured values thereof can be coded in accordance with a color space, for example. The color information or the underlying color space can therefore be multicolored (also referred to as photochromatic) or else single colored (also referred to as monochromatic). The monochromatic color information can for example comprise only grayscale values (then also referred to as grayscale value information) or comprise black-and-white values (then also referred to as black-and-white value information) which represent the intensity of the captured radiation at the wavelength or in the wavelength range for which the monochromatic sensor is sensitive. For visual rendering of the image data on a display device, said image data are converted into that image format which is predefined by the image memory of the graphics card. For ease of understanding, the image data described herein are represented as such visual rendering. In general, the image data, e.g. stored in a storage medium, can be present as a file (also referred to as a digital image or image file) in the respective image format.

The image data can furthermore be assigned (e.g. as an alternative or in addition to the color information) depth information (also referred to as 3D information). A so-called 3D camera can be used for capturing the depth information. The measured values of the 3D camera can comprise (e.g. pixel by pixel) information concerning a topography of the imaged reality (also referred to as depth information). By way of example, the depth information can specify the distance between a or each pixel of the camera of a location in space that is imaged onto the pixel. To put it another way, one distance of one object or distances of a plurality of objects can be determined using the depth information.

The depth information can illustratively add a third spatial dimension (referred to as depth herein) to the two spatial dimensions represented by the image data. By way of example, by means of the image data, an object can be represented as a projection onto the two-dimensional surface of the image sensor or the imaging sensor (also referred to as 2D image data). In addition to this the depth information spans the third spatial dimension. By way of example, the depth information can comprise values (also referred to as depth values) which are assigned to the image data segment wise (i.e. for each segment of the image data) and which indicate the depth thereof. By way of example, the depth information can comprise depth values which are assigned to the image data pixelwise (i.e. for each pixel of the image data) and which indicate the depth.

In accordance with various embodiments, depth information is obtained by means of three-dimensional (3D) image capture. The depth information can be used for example to recognize whether an object is situated outside or behind (as viewed from the imaging device) a reference plane. The spatial distance from the reference plane at which an object is situated can thus be distinguished. By way of example, it is possible to obtain the depth information through the entire capture region, such that illustratively from the side it is possible to recognize the spatial position of one or more than one object relative to the reference plane. The reference plane can be oriented for example along the direction of gravity if one or more than one perspective of the image capture device runs transversely with respect to the direction of gravity. In more general terms, the reference plane can run along a direction that is transverse with respect to the or each perspective of the imaging device. By way of example, the image data can also be captured obliquely from above.

In accordance with various embodiments, the image capture device can provide image data of the capture region from a plurality of optical perspectives (e.g. provided by means of a plurality of lenses) which represent depth information of the capture region, (e.g. stereoscopically). In order to determine the depth information, the image data captured from different perspectives (e.g. by means of a plurality of lenses) can be superposed on one another, e.g. taking account of a relative spatial pose (position and/or orientation) of the lenses with respect to one another. A camera can comprise an (optical) image capture sensor and at least one lens (also referred to as lens arrangement) assigned to the imaging sensor. The lens arrangement of a plenoptic camera can also comprise a grid of a plurality of micro lenses. By way of example, the imaging device can comprise an RGB imaging sensor and/or a 3D imaging sensor.

An imaging sensor (also referred to as an image sensor) is of the type of the optical sensor and can comprise one or more photoelectrically active regions (can also be referred to as pixel) which generate and/or modify an electrical signal e.g. in response to electromagnetic radiation (e.g. light, e.g. visible light). The imaging sensor can comprise or be formed from a CCD sensor (charge-coupled device sensor) and/or an active pixel sensor (can also be referred to as CMOS sensor), for example. Optionally, an imaging sensor can be configured in a wavelength-sensitive fashion (e.g. for capturing color information), e.g. by means of a plurality of color filters (e.g. in grid form), and can thus distinguish between different wavelengths.

The depth information can be quantified, e.g. with indication of the depth as value (also referred to as depth value), can be coded or can itself be provided by means of image data, e.g. by assignment of image data captured simultaneously from a different perspective (e.g. separately from one another or superposed on one another). The plurality of simultaneously captured perspectives can be superposed on one another, for example, in order to quantify the depth information. Each depth value of the depth information can then correspond for example to a deviation between the plurality of simultaneously captured perspectives.

Various embodiments relate to a self-service terminal and to a method for providing security at a self-service terminal. It may be necessary to prevent harmful behavior, such as, for example, fraud, theft, etc., at a self-service terminal. Illustratively, a self-service terminal and a method are provided which are able to provide security for a user during the use of a self-service terminal and also to prevent harmful behavior at a self-service terminal.

FIG. 1 illustrates a self-service terminal 100 in accordance with various embodiments. The self-service terminal 100 can be an automated teller machine (a cash machine), a self-service checkout or a self-service kiosk. The self-service terminal 100 can comprise an imaging device 102. The imaging device 102 can be configured to provide at least one digital image 104, for example to provide a plurality of digital images 106. The imaging device 102 can comprise one or more sensors. The one or more sensors can be configured to provide digital data. The imaging device 102 can be configured to provide the at least one digital image 104 or the plurality of digital images 106 using the digital data provided. In accordance with various embodiments, the digital data comprise digital image data. The one or more sensors can be imaging sensors, such as, for example, a camera sensor or a video sensor. The sensors of the plurality of sensors can comprise the same type or different types of sensors. The imaging device 102 can be configured to detect the digital data or the at least one digital image 104 in reaction to an event. The self-service terminal can comprise one or more motion sensors, for example, and the triggering event can be a movement detected by means of the one or more motion sensors.

The self-service terminal 100 can comprise a user interface configured to enable a person, such as a user, for example, to operate (for example by means of an input device of the user interface) the self-service terminal 100. The event that triggers the detection of the at least one digital image 104 can be an event triggered by the user, such as, for example, entry of a PIN at an automated teller machine, selection at a self-service kiosk, selecting or inputting a product at a self-service checkout, etc.

The self-service terminal 100 can furthermore comprise a storage device 108. The storage device 108 can comprise at least one memory. The memory can be used for example during the processing carried out by a processor. A memory used in the embodiments can be a volatile memory, for example a DRAM (dynamic random access memory), or a nonvolatile memory, for example a PROM (programmable read only memory), an EPROM (erasable PROM), an EEPROM (electrically erasable PROM) or a flash memory, such as, for example, a floating gate memory device, a charge trapping memory device, an MRAM (magnetoresistive random access memory) or a PCRAM (phase change random access memory). The storage device 108 can be configured to store digital images, such as, for example, the at least one digital image 104 or the plurality of digital images 106.

The self-service terminal 100 can furthermore comprise at least one processor 110. The at least one processor 110 can be, as described above, any type of circuit, i.e. any type of logic-implementing entity. The processor 110 can be configured to process the at least one digital image 104 or the plurality of digital images 106.

Figure 2:
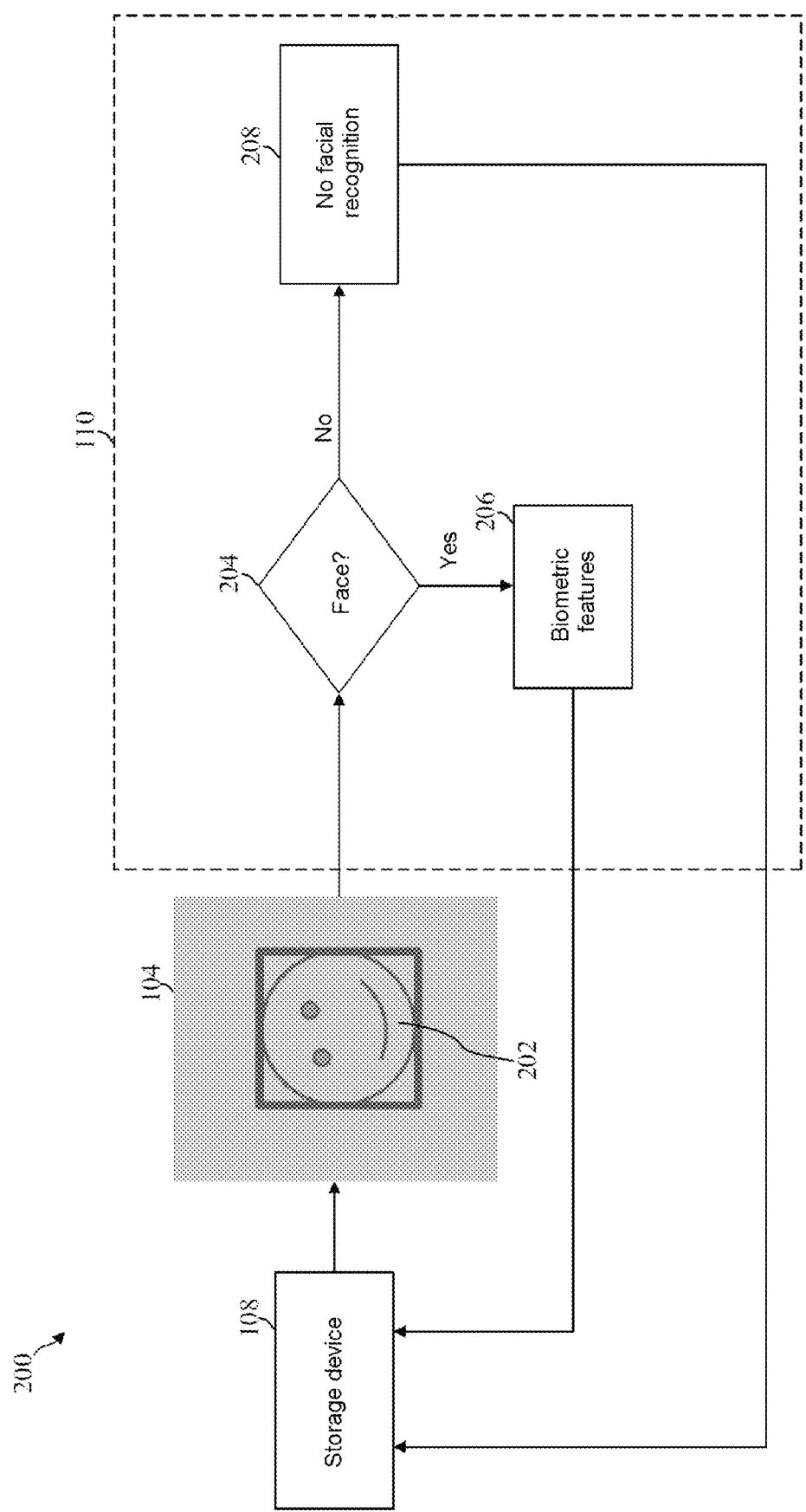
FIG. 2 shows a processing system for facial recognition in accordance with various embodiments.

FIG. 2 illustrates a processing system for facial recognition 200 in accordance with various embodiments. The processing system for facial recognition 200 can comprise the storage device 108. The storage device 108 can be configured to store 104, for example to store in volatile fashion, for example to store in nonvolatile fashion, digital images, such as, for example, the digital image 104 or the plurality of digital images 106. The processing system for facial recognition 200 can furthermore comprise the at least one processor 110. The storage device 108 can be configured to provide the processor 110 with the at least one digital image 104, and the processor 110 can be configured to process the at least one digital image 104.

The at least one digital image 104 can comprise a face 202 of a person. The processor 110 can be configured to apply a facial recognition method to the at least one digital image 104. The facial recognition method can comprise: determining 204 whether the at least one digital image 104 comprises a face 202 of a person. Determining 204 whether the at least one digital image 104 comprises a face 202 of a person can comprise using a facial recognition algorithm. The facial recognition algorithm can be a neural network, for example. The facial recognition method can be a biometric facial recognition method. The facial recognition method can be a two-dimensional facial recognition method or a three-dimensional facial recognition method. The processor 110 can furthermore be configured, if the at least one digital image 104 comprises the face 202 of the person ("Yes" in FIG. 2), to determine or to extract biometric features 206 of the face 202. In accordance with various embodiments, the facial recognition method is a biometric facial recognition method that provides the biometric features 206 of the recognized face 202. The storage device 108 can be configured to store the biometric features 206 of the face 202.

The processor 110 can furthermore be configured, if the at least one digital image 104 does not comprise a face of a person ("No" in FIG. 2), to provide first information 208 that no face was recognized, and the storage device 108 can be configured to store the first information 208 that no face was recognized.

Figure 3:
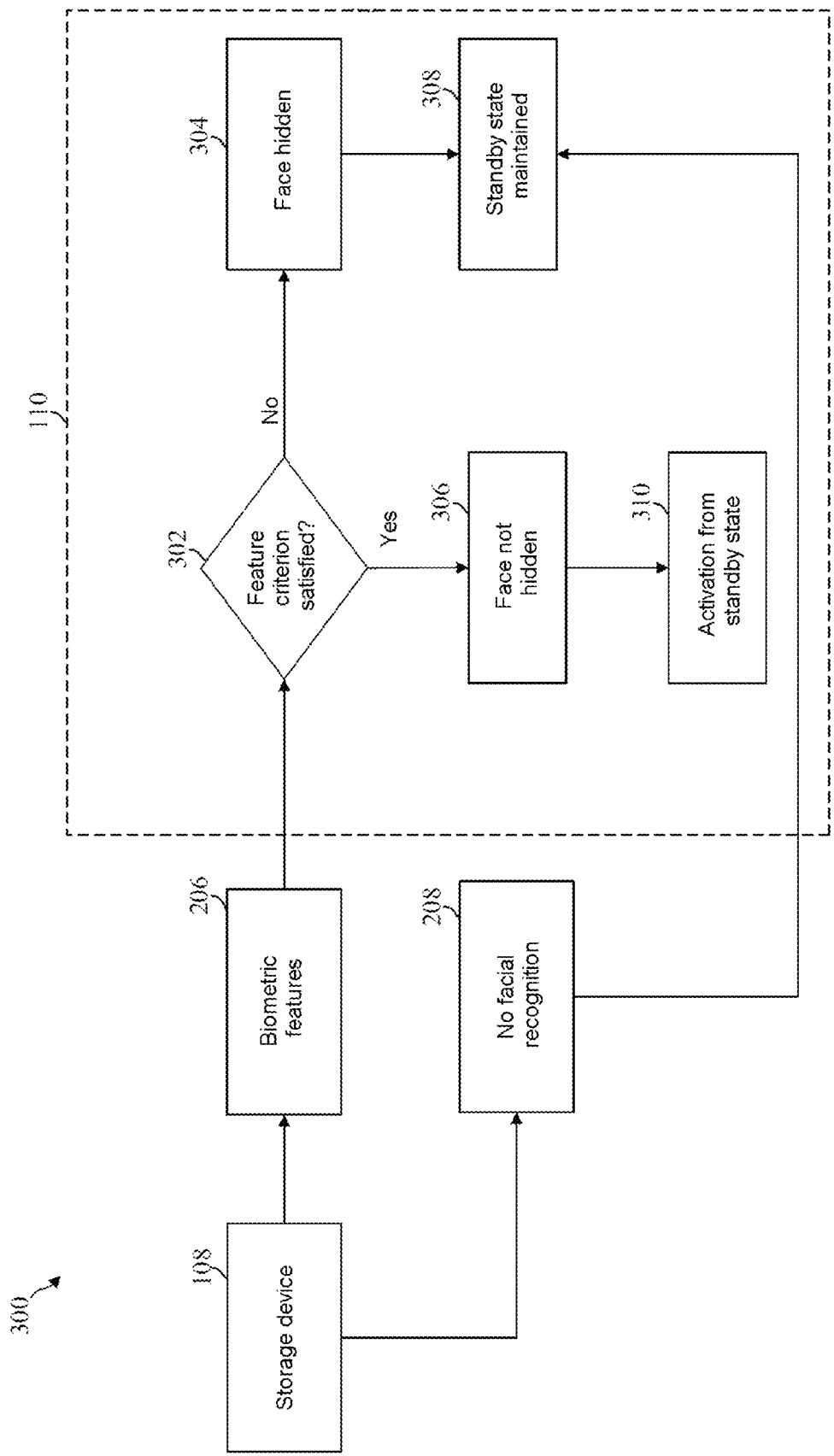
FIG. 3 shows a processing system in accordance with various embodiments.

FIG. 3 illustrates a processing system 300 in accordance with various embodiments. The processing system 300 can comprise the storage device 108. The storage device 108 can be configured to store the biometric feature 206 of the face 202 of the person. The processing system 300 can furthermore comprise the at least one processor 110. The at least one processor 110 can be configured to process the biometric features 206 of the face 202. The processor 110 can be configured to determine 302 whether a feature criterion of the biometric features 206 is satisfied. The feature criterion can comprise for example a required number of recognized biometric features and/or can comprise the presence of biometric features (for example the presence of biometric features of the mouth region of the face). The processor 110 can be configured, if the feature criterion of the biometric features 206 is not satisfied ("No" in FIG. 3), to determine second information 304 that the face 202 of the person is hidden. The face 202 can be hidden by a mask, for example. That is to say that the person assigned to the face 202 can be disguised. The processor 110 can be configured, if the feature criterion of the biometric features 206 is satisfied ("Yes" in FIG. 3), to determine third information 306 that the face 202 of the person is not hidden.

A facial recognition criterion can comprise the first information 208 that no face was recognized, the second information 304 that the face 202 is hidden, or the third information 306 that the face 202 is not hidden. The processor 110 can be configured to control the self-service terminal 100 using the facial recognition criterion depending on the result of the facial recognition method. That is to say that the processor 110 can be configured to control the self-service terminal using the first information 208 that no face was recognized, using the second information 304 that the face 202 is hidden, or using the third information 306 that the face 202 is not hidden. The self-service terminal 100 can be in a standby state (an operating state of readiness), for example. The processor 110 can be configured to maintain the standby state 308 using the first information 208 that no face was recognized. To put it another way, the processor 110 can be configured to maintain the standby state 308 if no face was recognized. The processor 110 can be configured to maintain the standby state 308 using the second information 304 that the face 202 is hidden. To put it another way, the processor 110 can be configured to maintain the standby state 308 if the face 202 is hidden. In accordance with various embodiments, the self-service terminal 100 furthermore comprises a user interface. The user interface can comprise a display device, which can be configured to provide the person (for example the user of the self-service terminal 100), i.e. the person to whom the face 202 is assigned, with information regarding the facial recognition (i.e. the result of the facial recognition method). The display device can be configured to provide the person with the second information 304 that the face 202 is hidden. By way of example, the display device can comprise a screen and can display the information regarding the facial recognition on the screen, for example in the form of text. The displayed information can comprise for example an instruction indicating that the person ought to expose, i.e. uncover or show, the face 202.

The processor 110 can be configured to control the self-service terminal 100 using the third information 306 that the face 202 is not hidden. The processor 110 can be configured for activating 310 the self-service terminal 100, for example for activating 310 from the standby state 308, if the face 202 is not hidden (third information 306).

Figure 4:
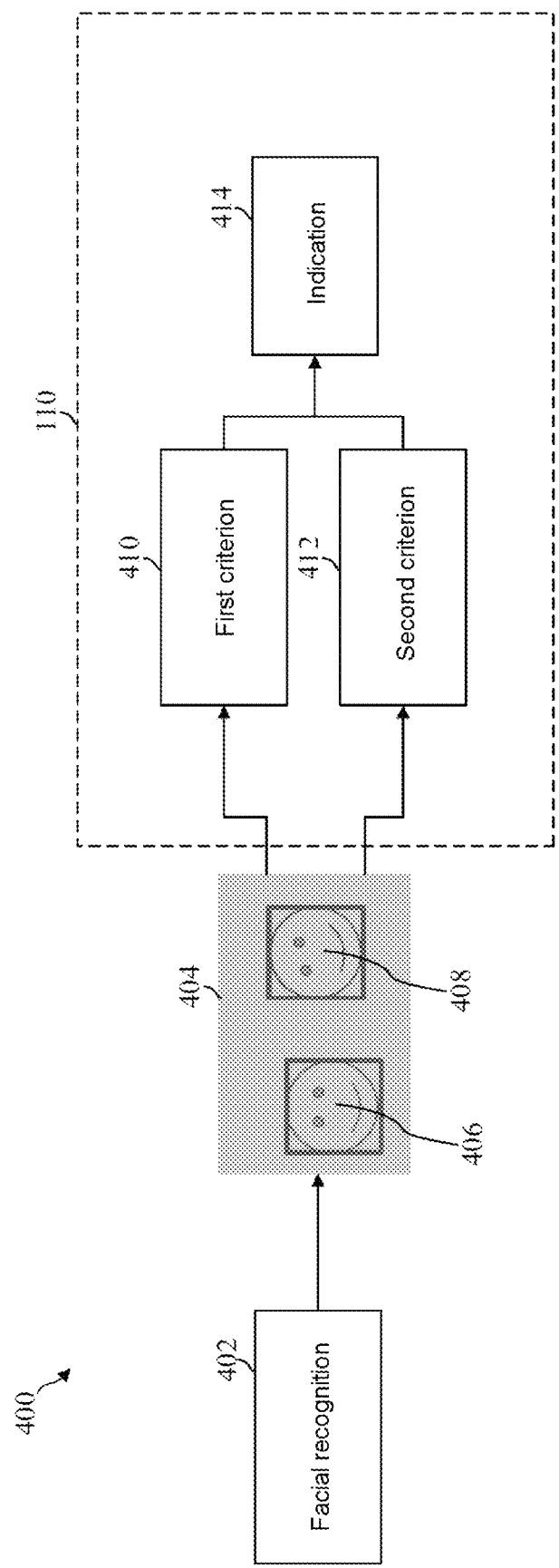
FIG. 4 shows a processing system in accordance with various embodiments.

FIG. 4 illustrates a processing system 400 in accordance with various embodiments. The processing system 400 can comprise facial recognition 402. The facial recognition 402 can substantially correspond to the processing system for facial recognition 200, wherein the facial recognition 402 can process at least one digital image 404, which can comprise more than one face. The at least one digital image 404 can comprise a first face 406 of a first person and a second face 408 of a second person, and the facial recognition 402 can be configured to determine or to recognize the first face 406 of the first person and the second face 408 of the second person in the at least one digital image 404. The facial recognition 402 can furthermore be configured to determine or to extract the biometric features of the first face 406 and/or the biometric features of the second face 408. The at least one processor 110 can be configured to determine whether a first criterion 410 is satisfied. The first criterion 410 can be assigned to the first face 406 of the first person. The processor 110 can be configured to determine whether a second criterion 412 is satisfied. The second criterion 412 can be assigned to the second face 408 of the second person. The first criterion 410 and/or the second criterion 412 can each be a facial recognition criterion, wherein the facial recognition criterion, as described above, can comprise information of whether a face is hidden, or information of whether a face is not hidden. The processor 110 can be configured to determine a first distance between the first person and the self-service terminal 100 and can furthermore be configured to determine a second distance between the second person and the self-service terminal 100. The processor 110 can be configured to determine the first distance and/or the second distance using the at least one digital image 404. The processor 110 can be configured to determine a first interocular distance using the biometric features of the first face 406 and can furthermore be configured to determine the first distance of the first person using the first interocular distance determined. The processor 110 can be configured to determine a second interocular distance using the biometric features of the second face 408 and can furthermore be configured to determine the second distance of the second person using the second interocular distance determined.

According to various embodiments, the self-service terminal 100 furthermore comprises at least one distance sensor, for example a plurality of distance sensors. The at least one distance sensor can be any type of sensor that is able to provide data which can be used to determine a distance. The at least one distance sensor can be a stereo camera, for example. The at least one distance sensor can be a remote locating sensor, such as, for example, a radar sensor, a LIDAR sensor or an ultrasonic sensor. The distance sensors of the plurality of distance sensors can comprise the same type or different types of distance sensors.

The at least one distance sensor can be configured to provide distance data, and the processor 110 can be configured to determine a distance of a person using the distance data provided. That is to say that the processor 110 can be configured to determine the first distance of the first person and the second distance of the second person using the distance data provided. In accordance with various embodiments, the processor 110 is configured to determine the first distance of the first person using the distance data provided and using the first interocular distance determined, and to determine the second distance of the second person using the distance data provided and using the second interocular distance determined.

The first criterion 410 and/or the second criterion 412 can be a distance criterion in each case. The processor 110 can be configured to control the self-service terminal 100 using the first criterion 410 and the second criterion 412.

In accordance with various embodiments, the first criterion 410 comprises a first facial recognition criterion and a first distance criterion and the second criterion 412 comprises a second facial recognition criterion and a second distance criterion and the processor 110 can control the self-service terminal 100 using the first criterion 410 and the second criterion 412.

The at least one processor 110 can be configured to determine an indication 414 using the first criterion 410 and the second criterion 412, and optionally to output said indication. In accordance with various embodiments, the self-service terminal 100 furthermore comprises a display device. The display device can be configured to provide a user of the self-service terminal 100, for example the first person, with information. The display device can comprise a screen, for example, and the display device can be configured to provide, i.e. display, information on the screen. The processor 110 can be configured to provide the display device with the indication 414 and the display device can be configured to provide information using the indication 414, for example to display said information on the screen. The imaging device 102 can comprise a video camera for providing a video stream and the display device can be configured to display the provided video stream on the screen.

By way of example, the determined first distance of the first person and the determined second distance of the second person can be greater than a first distance criterion and a second distance criterion, respectively, and the processor 110 can be configured to determine that neither the first person nor the second person is using the self-service terminal 100.

By way of example, the determined first distance of the first person can be less than a first distance criterion and the determined second distance of the second person can be less than a second distance criterion and it can furthermore be the case that the first facial recognition criterion and the second facial recognition criterion are not satisfied, that is to say that the processor 110 determines that the first person and the second person are disguised or masked. The processor 110 can be configured to determine that a security violation might be present, and can be configured to communicate information to a security service and/or the police.

By way of example, the determined first distance of the first person can be less than a first distance criterion and the determined second distance of the second person can be less than a second distance criterion, wherein the first distance of the first person is less than the second distance of the second person. In this case, the processor 110 can determine, for example, that the first person is a user of the self-service terminal 100 and that the second person is not a user of the self-service terminal 100. The processor 110 can determine, for example, that the second person is not complying with a personal space distance. Furthermore, the first facial recognition criterion and the second facial recognition criterion can be satisfied, that is to say that the processor 110 determines that the first person and the second person are not disguised. The processor 110 can be configured to determine that a security violation might be present. The self-service terminal 100 can be an automated teller machine and the security violation may be, for example, that the second person, who was not determined as a user of the self-service terminal 100, is attempting to covertly observe the PIN (personal identification number) of the first person, who was determined as a user of the self-service terminal 100. The processor 110 can be configured to communicate the indication 414 that a security violation might be present to the display device, and the display device can be configured to provide the first person, i.e. the user of the self-service terminal 100, with information. The display device can be configured to provide the first person with the at least one digital image 404 comprising the face 406 of the first person and the face 408 of the second person, for example to display it on the screen. The processor 110 can furthermore be configured to provide the display device with the first distance of the first person and the second distance of the second person. The display device can be configured to mark the first face 406 of the first person displayed on the screen as a user, for example to represent it with a first colored frame, such as a green frame, for example, and can furthermore be configured to mark the second face 408 of the second person displayed on the screen as a potential threat, for example to represent it with a second colored frame, such as a blue, yellow or red frame, for example, wherein a respective marking, such as, for example, a blue frame or a red frame, can be selected depending on the determined second distance of the second person. The display device can furthermore be configured to provide the first person with additional information, for example in the form of text, as sound, etc. In accordance with various embodiments, the self-service terminal 100 furthermore comprises a user interface, wherein the user interface can comprise the display device and wherein the user interface can furthermore comprise an input device. The input device can be configured to enable the user of the self-service terminal 100 to interact with the self-service terminal 100. The input device can be for example a keypad, for example a keyboard. The display device and the input device can be integrated as a touch-sensitive screen (touchscreen). The information provided by means of the display device can enable the first person to deny the potential threat by means of the input device. That is to say that the first person can indicate by means of the user interface that the second person is not a threat (the second person may be, for example, a friend, a partner or a family member). The processor 110 can be configured to block a use of the self-service terminal 100 until the first person, i.e. the user, has denied the potential threat.

Figure 5:
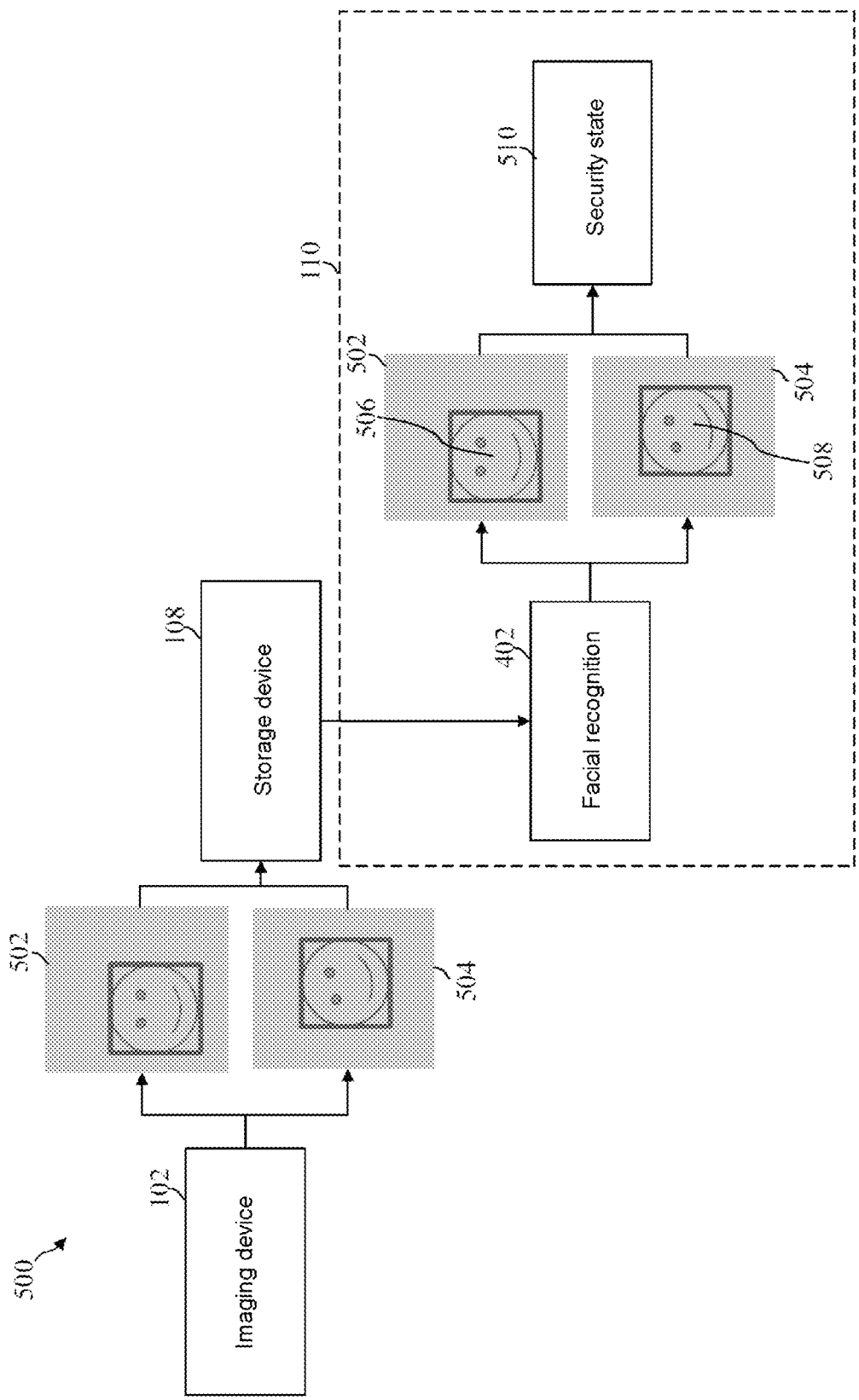
FIG. 5 shows a processing system in accordance with various embodiments.

FIG. 5 illustrates a processing system 500 in accordance with various embodiments. The self-service terminal 100 can comprise the processing system 500. The processing system 500 can comprise the imaging device 102. The imaging device 102 can be configured to provide a first digital image 502 and a second digital image 504. The second digital image 504, from a temporal standpoint, can follow the first digital image 502. To put it another way, the second digital image 504 can be detected temporally after the first digital image 502. The first digital image 502 and the second digital image 504 can be detected during the operation of the self-service terminal 100. To put it another way, the first digital image 502 and the second digital image 504 can be detected in a time window given by a start process of the self-service terminal 100 and an end process of the self-service terminal 100. That is to say that the time window can begin with a start process, such as, for example, selection at a self-service kiosk or entry of a PIN at an automated teller machine, and can end with an end process, such as, for example, withdrawal of the money from a dispensing tray of the automated teller machine.

The processing system 500 can furthermore comprise the storage device 108 for storing the first digital image 502 and the second digital image 504. The processing system 500 can comprise the at least one processor 110. The processor 110 can be configured to process the first digital image 502 and the second digital image 504. The processor 110 can be configured to carry out the facial recognition 402. That is to say that the processor 110 can be configured to determine whether the first digital image 502 and/or the second digital image 504 comprise(s) a face of a person. The processor 110 can be configured, if the first digital image 502 comprises a face of a person, to determine or to extract first biometric features of the face, and can be configured, if the second digital image 504 comprises a face of a person, to determine or to extract second biometric features of the face. The processor 110 can furthermore be configured, as described with reference to FIG. 4, to determine a distance of a person. That is to say that the processor 110 can be configured to determine the distance of the person using the interocular distance of the person (for example determined using the biometric data) and/or the self-service terminal 100 can comprise at least one distance sensor for providing distance data and the processor 110 can be configured to determine the distance of the person using the distance data.

By way of example, the processor 110 can determine that the first digital image 502 comprises a first face 506 of a first person. The processor 110 can furthermore determine a first distance of the first person. The processor 110 can be configured to determine the first person as a user of the self-service terminal using the determined first face 506 of the first person and optionally using the first distance of the first person. The processor 110 can determine, for example, that the second digital image 504 does not comprise a face of a person and the processor 110 can be configured to control the self-service terminal 100 in such a way that the self-service terminal 100 transitions to a security state 510. The processor 110 can be configured to control the self-service terminal in such a way that the self-service terminal 100 transitions to a security state 510 after a predefined time interval (for example after 5 seconds, for example after 10 seconds, for example after more than 10 seconds) after the detection of the second digital image 504 that does not comprise a face of a person. The security state 510 can also be the standby state if the self-service terminal 100 is in a non-critical state (for example is in a state in which a second person could not cause damage) at the time of the detection of the second digital image 504.

The self-service terminal 100 can be an automated teller machine and the second digital image 504 can be detected at a time at which the money dispensing tray is open and has money; the security state 510 can comprise for example the money dispensing tray being closed. The self-service terminal can comprise the user interface and the processor 110 can furthermore be configured to communicate information regarding the security state 510 to the display device of the user interface. The display device can be configured to provide the information regarding the security state 510, for example to display it on a screen, for example to output an acoustic indication, such as an acoustic signal, for example. To put it another way, the display device can be configured to make a user aware of the security state 510, i.e. for example the open money dispensing tray having the money, by means of displaying or outputting the information on a screen and/or by means of outputting an acoustic indication.

By way of example, the processor 110 can determine that the first digital image 502 comprises a first face 506 of a first person. The processor 110 can furthermore determine a first distance of the first person. The processor 110 can be configured to determine the first person as a user of the self-service terminal using the determined first face 506 of the first person and optionally using the first distance of the first person. The processor 110 can be configured to determine first biometric features of the first face 506 of the first person or to extract them from the first digital image 502. The processor 110 can determine, for example, that the second digital image 504 comprises a second face 508 of a second person. The processor 110 can be configured to determine second biometric features of the second face 508 of the second person or to extract them from the second digital image 504. The processor 110 can determine, for example, that the second face 508 is different than the first face 506. To put it another way, the first biometric features determined can be different than the second biometric features determined. The processor 110 can be configured to control the self-service terminal 100 in such a way that the self-service terminal 100 transitions to the security state 510 if said processor determines that the first biometric features and the second biometric features are different. That is to say that the second digital image 504 comprises a different person than the first digital image 502. The self-service terminal 100 can be an automated teller machine and the second digital image 504 can be detected at a time at which the money dispensing tray is open and has money; the security state 510 can comprise for example the money dispensing tray being closed. The self-service terminal 100 can be an automated teller machine and the second digital image 504 can be detected at a time at which the PIN of the user has already been entered; the security state 510 can comprise for example the self-service terminal 100, i.e. the automated teller machine, being blocked so that no money can be withdrawn. For example, renewed entry of a PIN can be requested in this case. The self-service terminal 100 can comprise the user interface and the processor 110 can furthermore be configured to communicate information regarding the security state 510 to the display device of the user interface. The display device can be configured to provide the information regarding the security state 510, for example to display it on a screen.

In accordance with various embodiments, the at least one processor 110 of the self-service terminal 100 can be configured, depending on the result of the facial recognition method applied to the at least one digital image 104 or the digital image 404, to determine further abnormal behavior, such as, for example, the presence of a large number of persons, the presence of one or more persons without use of the self-service terminal 100, persons moving quickly (i.e. more quickly than a predefined speed criterion), etc., and to control the self-service terminal 100 in reaction to the abnormal behavior determined (for example to transition to a security state, for example to inform a security service, etc.).

In one or more (for example each) of the processing system 300, the processing system 400 and/or the processing system 500, the at least one processor 110 can be configured to erase at least one digital image stored in the storage device 108 (for example each digital image of the plurality of digital images stored in the storage device 108) and/or the biometric features determined using a digital image (for example the biometric features 206 of the face 202 determined using the at least one digital image 104) after a termination criterion has been satisfied. To put it another way, the processor 110 can be configured to communicate a command to the storage device 108, and the storage device 108 can be configured to erase the respective digital image and/or the respective biometric features in reaction to the command. The termination criterion can define an end process of the operation of the self-service terminal 100. By way of example, the self-service terminal 100 can be an automated teller machine and the termination criterion can be the withdrawal of the money from a dispensing tray. By way of example, the self-service terminal 100 can be a self-service checkout and the termination criterion can be the successful payment process or the packing of the product(s) or goods.

Figure 6:
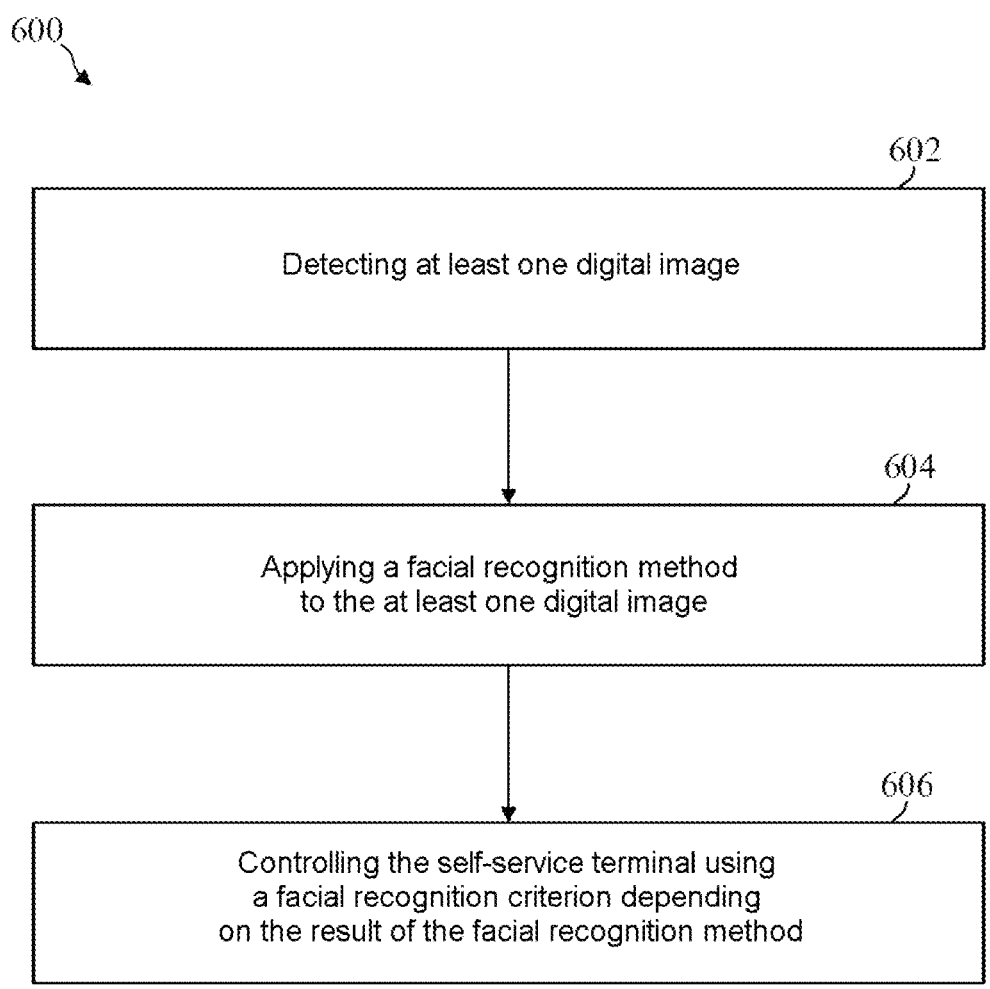
FIG. 6 shows a method for providing security at a self service terminal in accordance with various embodiments.

FIG. 6 illustrates a method 600 for providing security at a self-service terminal 100 in accordance with various embodiments. The method 600 can comprise detecting at least one digital image 104 (in 602). The method 600 can furthermore comprise applying a facial recognition method to the at least one digital image 104 (in 604). The facial recognition method can comprise: determining whether the at least one digital image 104 comprises a face of a person. The facial recognition method can furthermore comprise: if the at least one digital image 104 shows the face 202 of the person, extracting biometric features 206 of the face 202. The method 600 can furthermore comprise: controlling the self-service terminal 100 using a facial recognition criterion depending on the result of the facial recognition method (in 606). The facial recognition criterion can comprise whether a face of a person was recognized or whether no face was recognized. The facial recognition criterion can be dependent on the extracted biometric features 206 of the face 202. The facial recognition criterion can comprise for example whether the extracted biometric features 206 satisfy or do not satisfy a feature criterion 302, wherein the face 202 can be hidden if the feature criterion 302 is not satisfied, and wherein it can be the case that the face 202 is not hidden if the feature criterion is satisfied. The self-service terminal 100 can be controlled in such a way that the self-service terminal 100 is activated from a standby state if the face 202 is not hidden. The self-service terminal 100 can be controlled in such a way that the self-service terminal 100 maintains a standby state if the face 202 is hidden.

The facial recognition method can determine that the digital image 404 comprises a first face 406 of a first person and a second face 408 of a second person, and the method 600 can comprise controlling the self-service terminal 100 using a first criterion 410 and a second criterion 412, wherein the first criterion 410 can be assigned to the first face 406 of the first person and the second criterion 412 can be assigned to the second face 408 of the second person. Controlling the self-service terminal 100 can comprise providing the at least one digital image 104, 404 to the first person and/or the second person, for example displaying the at least one digital image 104, 404 on a screen of the self-service terminal 100. The method 600 can comprise detecting a first digital image 502 and a second digital image 504 (optionally in 602). The second digital image 504, from a temporal standpoint, can follow the first digital image 502 (i.e. can be detected at a later time). The method 600 can comprise applying the facial recognition method to the first digital image 502 and the second digital image 504 (optionally in 604). The facial recognition method can determine that the first digital image 502 comprises a first face 506 of a first person and that the second digital image 504 does not comprise the first face 506. The method 600 can comprise controlling the self-service terminal 100 depending on the result of the facial recognition method (optionally in 606). The method 600 can comprise: controlling the self-service terminal 100 in such a way that the self-service terminal 100 transitions to a security state if the first digital image 502 comprises the first face 506 of the first person and if the second digital image 504 does not comprise the first face 506.

The invention claimed is:

1. A method of operating a self-service terminal comprising:
    detecting a first digital image with an imaging device of the self-service terminal;
    applying, with at least one processor of the self-service terminal, a facial recognition program to the first digital image;
    locating, with the at least one processor while executing the facial recognition program, a first face of a first person in the first digital image;
    extracting, with the at least one processor, one or more first biometric features of the first face from the first digital image;
    storing, in a storage device of the self-service terminal, the one or more first biometric features of the first face;
    determining, with the at least one processor, whether a number of the one or more first biometric features of the first face is at least equal to a first facial recognition criterion;
    controlling, with the at least one processor, the self-service terminal based on the result of said determining whether the number of the one more first biometric features of the first face is at least equal to a first facial recognition criterion;
    receiving, with the self-service terminal, a personal identification number ("PIN") from the first person at the self-service terminal;
    detecting a second digital image with the imaging device after said receiving and temporally after said detecting the first digital image;
    applying, with the at least one processor, the facial recognition program to the second digital image;
    locating, with the at least one processor while executing the facial recognition program, a second face of a second person in the second digital image;
    determining, with the at least one processor, that the second face is not the first face; and
    displaying, with a display device of the self-service terminal, information that the PIN must be received again, in response to said determining that the second face is not the first face.

2. The method of claim 1 wherein said controlling is further defined as:
    controlling, with the at least one processor, the self-service terminal to activate from a standby state when the number of the one more first biometric features of the first face is at least equal to a first facial recognition criterion.

3. The method of claim 1 wherein said controlling is further defined as:
    controlling, with the at least one processor, the self-service terminal to maintain a standby state when the number of the one more first biometric features of the first face is not at least equal to a first facial recognition criterion.

4. The method of claim 1 further comprising:
    controlling, with the at least one processor, the self-service terminal to block dispensing of currency in response to said determining that the second face is not the first face;
    receiving, with the self-service terminal, the PIN for a second time; and
    controlling, with the at least one processor, the self-service terminal to dispense currency after said receiving the PIN the second time.

5. The method of claim 1 further comprising:
    determining, with the at least one processor, a first distance between the first person and the self-service terminal;
    determining, with the at least one processor, a second distance between the second person and the self-service terminal;
    determining, with the at least one processor, that the first distance is less than the second distance; and
    controlling, with the at least one processor, the self-service terminal to block dispensing of currency in response to said determining that the first distance is less than the second distance.

6. The method of claim 5 further comprising:
    displaying, with the display device, the first image with the first face and the second image with the second face in response to said determining that the first distance is less than the second distance.

7. The method of claim 6 wherein said displaying the first image and the second image is further defined as:
    displaying, with the display device, the first image with the first face and with a first frame of a first color and the second image with the second face and with a second frame of a second color different from the first color in response to said determining that the first distance is less than the second distance.

8. The method of claim 5 further comprising:
    displaying, with the display device, the first distance and the second distance in response to said determining that the first distance is less than the second distance.

9. The method of claim 5 further comprising:
    requesting, with a display device of the self-service terminal, a user input that the second person is not a threat in response to said determining that the first distance is less than the second distance; and
    controlling, with the at least one processor, the self-service terminal to block the dispensing of currency until after the user input is received.

10. The method of claim 1 wherein said detecting the second digital image is further defined as:
    detecting the second digital image with the imaging device after said receiving and temporally after said detecting the first digital image and at a time at which a money dispensing tray of the self-service terminal is open and has money.

11. The method of claim 10 further comprising:
    controlling, with the at least one processor, the self-service terminal to close the money dispensing tray in response to said determining that the second face is not the first face.

* * * * *